(12) United States Patent
Robinson et al.

(10) Patent No.: US 7,542,505 B2
(45) Date of Patent: Jun. 2, 2009

(54) SYSTEMS AND METHODS FOR SIGNAL CONVERSION

(75) Inventors: Ian Robinson, Venice, CA (US); Frank Winter, San Diego, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 955 days.

(21) Appl. No.: 10/689,275

(22) Filed: Oct. 20, 2003

(65) Prior Publication Data

US 2005/0083996 A1  Apr. 21, 2005

(51) Int. Cl.
*H04B 1/00* (2006.01)

(52) U.S. Cl. .................. 375/140; 375/130; 375/131; 375/295; 375/296

(58) Field of Classification Search .......... 375/140, 375/141, 146, 133, 130–131, 295–296, 377; 370/335; 341/143, 144
See application file for complete search history.

(56) References Cited

U.S. PATENT DOCUMENTS

| | | | | |
|---|---|---|---|---|
| 5,564,097 A * | 10/1996 | Swanke | ............. | 455/302 |
| 5,719,905 A * | 2/1998 | Cohen et al. | ............. | 375/346 |
| 5,751,705 A * | 5/1998 | Sato | ............. | 370/335 |
| 5,966,646 A * | 10/1999 | Lampe et al. | ............. | 455/189.1 |
| 6,101,225 A | 8/2000 | Thorson | | |
| 6,144,694 A * | 11/2000 | Uta et al. | ............. | 375/146 |
| 6,289,038 B1 * | 9/2001 | Park | ............. | 375/131 |
| 6,345,073 B1 * | 2/2002 | Curry et al. | ............. | 375/265 |
| 6,420,987 B1 * | 7/2002 | Schoner et al. | ............. | 341/143 |
| 6,549,067 B1 * | 4/2003 | Kenington | ............. | 330/52 |
| 6,683,905 B1 * | 1/2004 | King et al. | ............. | 375/141 |
| 6,738,604 B2 * | 5/2004 | Swazey | ............. | 455/118 |
| 6,873,281 B1 * | 3/2005 | Esterberg et al. | ............. | 341/163 |
| 7,099,402 B2 * | 8/2006 | Mollenkopf | ............. | 375/295 |
| 2002/0054619 A1 * | 5/2002 | Haas | ............. | 375/133 |
| 2002/0160732 A1 * | 10/2002 | Panasik et al. | ............. | 455/232.1 |
| 2003/0043933 A1 * | 3/2003 | Kintis | ............. | 375/308 |
| 2003/0078020 A1 | 4/2003 | Kintis | | |
| 2004/0085937 A1 * | 5/2004 | Noda | ............. | 370/335 |
| 2004/0125860 A1 * | 7/2004 | Tojo et al. | ............. | 375/146 |
| 2004/0252667 A1 * | 12/2004 | Dent | ............. | 370/335 |
| 2007/0041310 A1 * | 2/2007 | Tulino | ............. | 370/205 |

FOREIGN PATENT DOCUMENTS

DE      100 42 959 C1      1/2002

OTHER PUBLICATIONS

International Search Report for PCT/US2004/034482 completed Jan. 27, 2005 by I. Douglas of the European Patent Office.

(Continued)

*Primary Examiner*—Mohammad H Ghayour
*Assistant Examiner*—Sophia Vlahos
(74) *Attorney, Agent, or Firm*—Tarolli, Sundheim, Covell & Tummino LLP

(57) ABSTRACT

Systems and methods for signal conversion are provided. Signals are spread in a continuous spectrum by a spread spectrum signal, such as a direct sequence spread spectrum (DS-SS) signal. The signals are then processed, which may include but is not limited to analog-to-digital conversion, digital-to-analog conversion, frequency conversion, clipping, filtering or a plurality of processes. The processed signal is then despread using substantially the same spreading signal that was used to spread the signal.

14 Claims, 10 Drawing Sheets

OTHER PUBLICATIONS

Translation of Abstract for DE 100 42 959 C1.
Halamek, et al., "Dynamic Range and Acquisition System", Measurement Science Review, vol. 1, No. 1, 2001, p. 71-74.
Roberts, et al., "The ABCs of Spread Spectrum—A technology Introduction and Tutorial", http://sss-mag.com/ss.html, p. 1-8, Last Viewed Sep. 26, 2003.

* cited by examiner

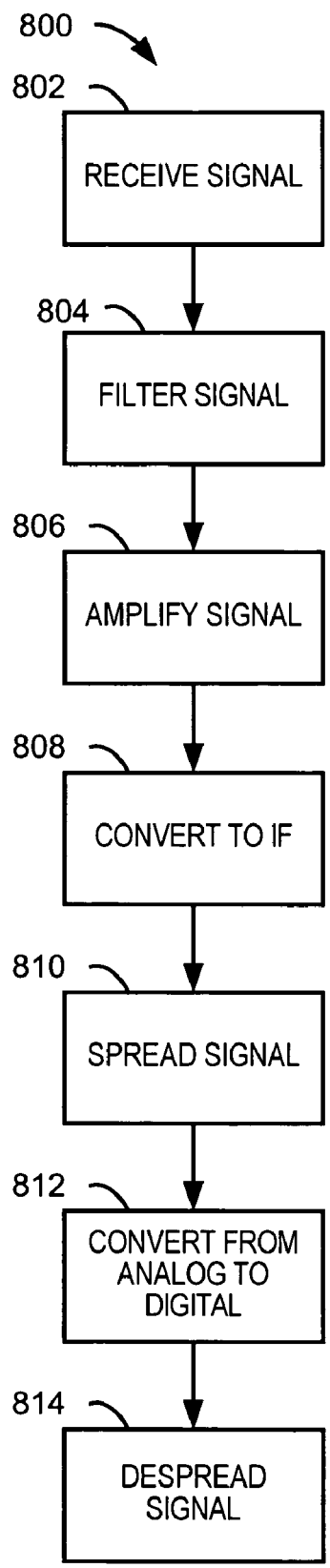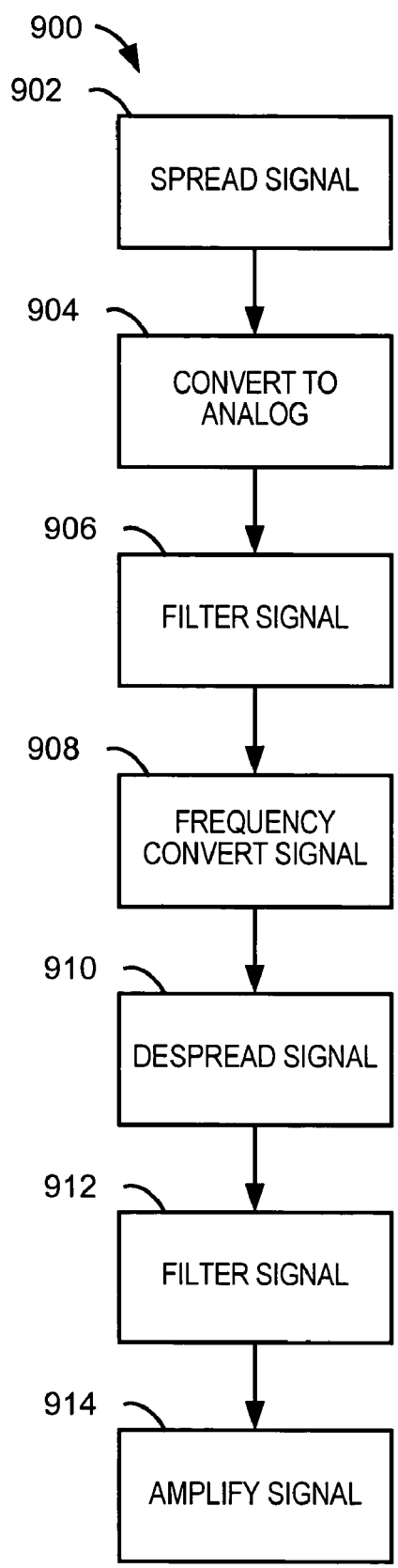
FIG. 17
FIG. 18

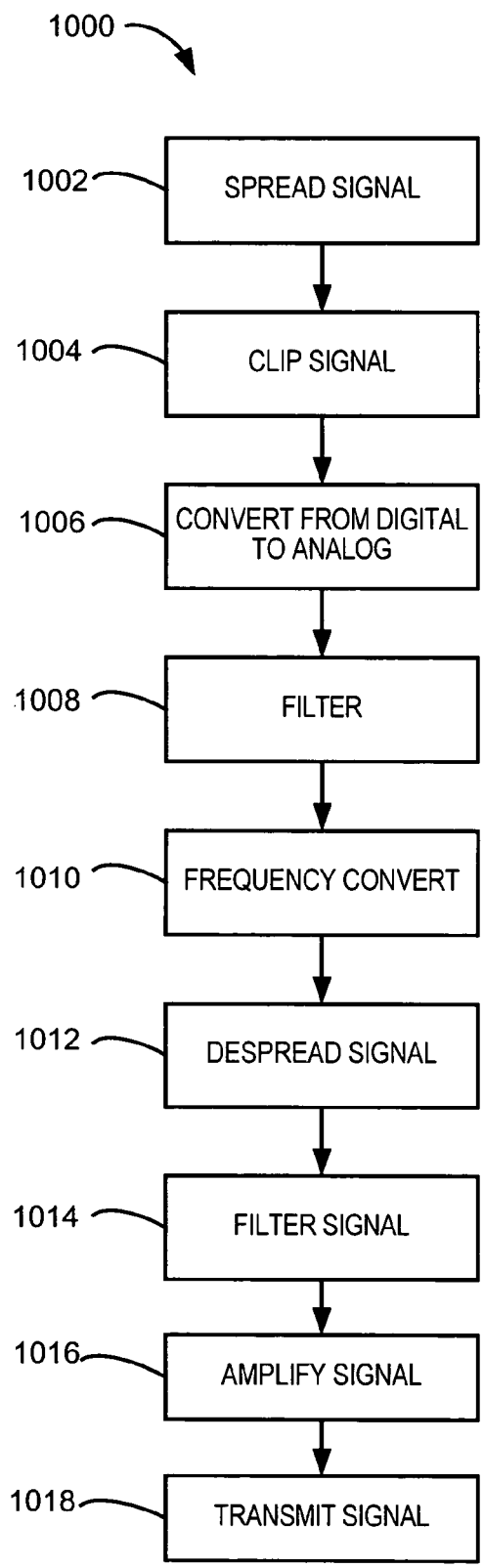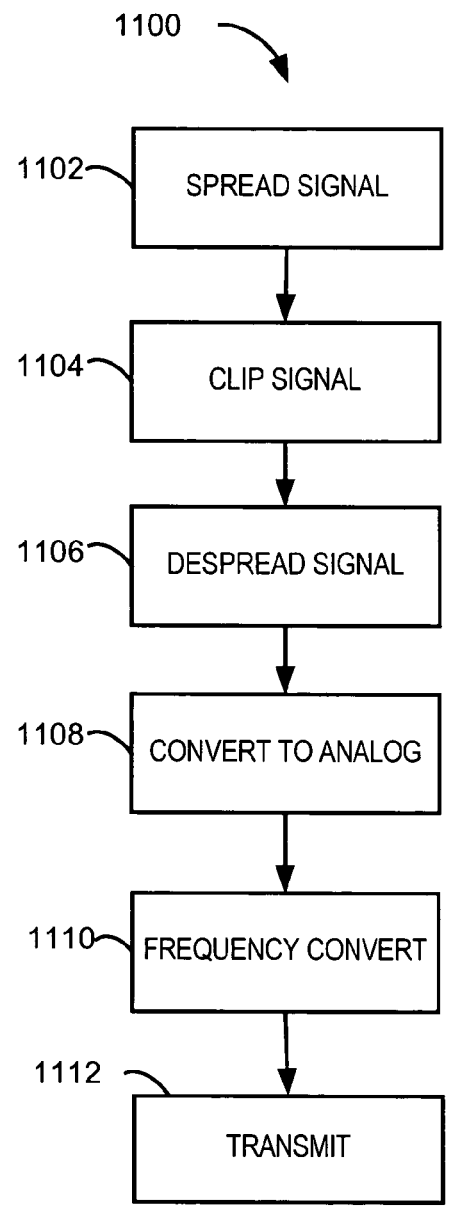
FIG. 19
FIG. 20

SYSTEMS AND METHODS FOR SIGNAL CONVERSION

TECHNICAL FIELD

The present invention relates generally to electronics, and more particularly to systems and methods for signal conversion.

BACKGROUND OF THE INVENTION

Efforts in the design of communication systems generally focus on improving performance, reducing cost or a combination thereof. One area of increasing interest relates to conversion of signals, such as from analog-to-digital or digital-to-analog. As communications systems become increasingly complex, increased dynamic range and increased resolution is required in the signal conversion process. The expense of signal conversion components increases dramatically with an increase in dynamic range and resolution of the converter.

Dynamic range describes the range of the input signal levels that can be reliably measured simultaneously and in particularly the ability of a converter to accurately measure small signals in the presence of large signals. The range of signal amplitudes (or signal strengths) a converter can resolve is typically expressed in decibels. A converter with a dynamic range of 60 dB means that it can resolve signals in the range in amplitude or power from x to 1000x. Dynamic range is important in communication applications where signal strengths vary dramatically. For example, if an analog-to-digital converter (ADC), of a particular dynamic range, receives a signal that is too large, the ADC will over-range the ADC input. The signal may be clipped or become non-sensible. If the same ADC receives a signal that is too small, the signal will get lost in the quantization noise of the converter.

The dynamic range of signal conversion components has an upper bound that is limited by the system full scale signal (e.g., peak levels), and a lower bound that is limited by two independent error signals: system noise floor and spurious signals. The system noise floor is composed of several factors including component (e.g., amplifier) voltage or current noise and quantization noise. The converted signal is equal to the input signal plus system noise. The main source of spurious signals is non-linearities in components such as mixers, amplifiers, and data converters. They can have a higher amplitude than noise and may be added to the wanted signals, contaminate nearby channels, or appear as out-of-band emissions.

SUMMARY OF THE INVENTION

The present invention relates to systems and methods for signal conversion. The signal to be processed is spread before processing, and then despread after processing. Processing may include, but is not limited to, digital-to-analog conversion, analog-to-digital conversion, clipping, frequency conversion, and/or filtering.

Another aspect of the present invention is directed to a system for signal conversion. The system includes a spreader that combines a spreading signal with an input signal to provide a spread input signal. A signal converter converts the spread input signal from a first domain to a second domain to provide a converted spread input signal. A despreader despreads the converted spread input signal to provide the input signal in the second domain.

According to another aspect of the present invention, a signal conversion system is provided. The signal conversion system includes a spreading code generator that produces a direct sequence spread spectrum (DS-SS) signal. A spreading circuit combines an input signal with the DS-SS signal to provide a spread input signal. A clipping component reduces peaks associated with the spread input signal. A despreading circuit despreads the peak reduced spread input signal.

According to yet another aspect of the present invention, a method for signal conversion is provided. The method includes spreading a signal with a direct sequence spread spectrum (DS-SS) signal in a first domain, converting the spread signal from the first domain to a second domain, and despreading the signal with a DS-SS signal in the second domain.

BRIEF DESCRIPTION OF THE DRAWINGS

FIG. 17 is a block diagram of a method for signal conversion in accordance with an aspect of the present invention.

FIG. 18 is a block diagram of a method for signal conversion in accordance with another aspect of the present invention.

FIG. 19 is a block diagram of a method for signal conversion in accordance with yet another aspect of the present invention.

FIG. 20 is a block diagram of a method for signal conversion in accordance with yet a further aspect of the present invention.

DETAILED DESCRIPTION OF INVENTION

The present invention relates generally to systems and methods for signal conversion. Input signals which may be analog or digital are spread with spreading codes (e.g., Pseudo Random codes, Pseudo Noise codes) to provide a spread spectrum signal (e.g., a direct sequence spread spectrum (DS-SS) signal). The signals are then converted from a first domain (e.g., digital, analog) to a second domain (e.g., analog, digital) via a signal converter. The converted signal is then despread using substantially the same codes as used to spread the signal. The spreading codes to provide the spreading code signal can be selected from a variety of spread spectrum standards or a combination of spread spectrum standards. For example, the spreading signal can be a DS-SS signal, which can also be combined with a frequency hopped spread spectrum (FH-SS) signal.

The spreading prior to signal conversion and the despreading subsequent to signal conversion reduces linearity requirements in signal conversion devices in addition to transmit and receive chains in which the signal converters may be employed. Reduced linearity requirements are desirable because they enable lower cost, lower dynamic range and less complex components such as amplifiers, frequency conversion components, ADCs and DACs. Therefore, an improved dynamic range system can be provided with lower dynamic range devices.

Additionally, a greater range of frequency plans can be employed. For example, many ADCs provide maximum performance at low IF, which can require a double down-conversion. Unfortunately, double down-conversion architectures produce a large number of spurs. To accept these spurs, highly linear components are necessary. The signal conversion technique of the present invention enables lower dynamic range signal converters to be employed since the signal is spread out over a larger bandwidth with lower amplitudes. Additionally, spurs and unwanted noise are filtered during the despreading process because the spurs and unwanted noise are spread over a wide range of frequencies than the wanted signal and some of the spurious signals are lost when despreading is applied followed by filtering.

Figure 1:
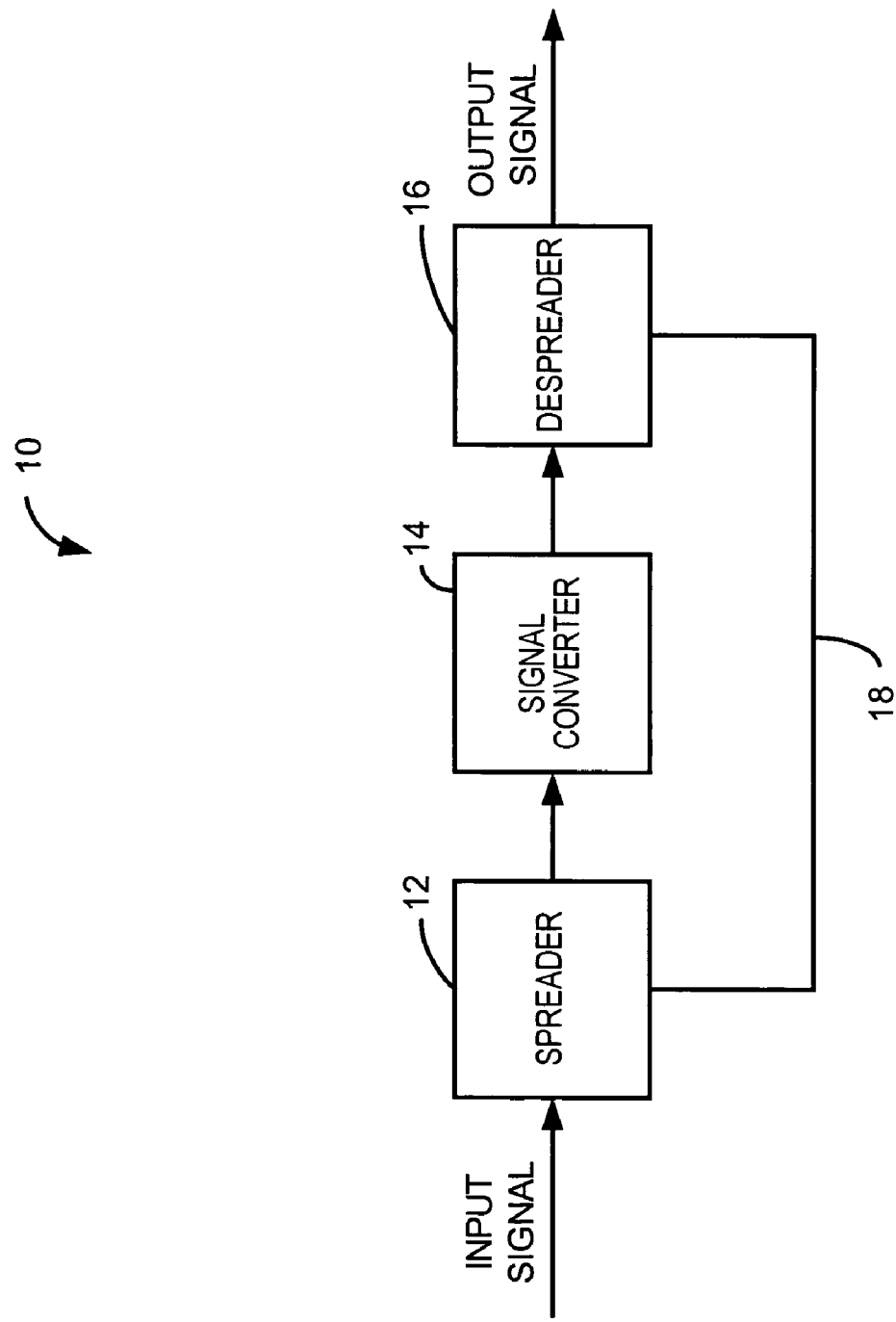
FIG. 1 is a block diagram schematically illustrating a system in accordance with an aspect of the present invention.

FIG. 1 illustrates a signal conversion system 10 in accordance with an aspect of the present invention. The signal conversion system 10 employs spreading and despreading techniques to improve dynamic range associated with signal conversion. The signal conversion system includes a spreader 12. The spreader 12 generates spreader codes (e.g., Pseudo Random codes, Pseudo Noise codes) to provide a spread spectrum signal (e.g., a DS-SS signal, a DS-SS signal combined with FH-SS signal). When the same spreading code is applied twice the original signal is preserved, and the spreading signal can be psuedo-random. DS-SS systems can spread signals over very wide bandwidths. Combining FH-SS and DS-SS provides very large bandwidths that need not be contiguous. The spreader 12 combines the spread spectrum signal with an input signal to provide a spread input signal. The input signal can be a single or multi-carrier signal. For example, the input signal can conform to a wireless standard such as Wideband Code Division Multiple Access (WCDMA), Orthogonal Frequency Division Multiplexing (OFDM), and single or multi-carrier versions of Global Standard for Mobile Communication (GSM) and Code Division Multiple Access 2000 (CDMA 2000).

The signal converter 14 receives the spread input signal and converts the signal. The signal converter 14 can convert the signal from a first domain to a second domain, such as from the digital domain to the analog domain or from the analog domain to the digital domain.

The converted spread input signal is then provided to a despreader 16. The despreader 16 despreads the converted spread input signal with substantially the same codes (e.g., Pseudo Random codes, Pseudo Noise codes) as the spreader 12. The despreader 16 despreads the converted spread input signal and provides an output signal corresponding to the original input signal in the second domain. For example, if the input signal is analog, the output signal is digital. If the input signal is digital, the output signal is analog. The despreader 16 also removes spurs and unwanted noise since spurs and unwanted noise are filtered during the despreading process because the spurs and unwanted noise are spread over a wide range of frequencies, while the desired signal is despread. Optionally, a feedback or feedforward signal 18 may be provided to facilitate time alignment or synchronization.

While the conversion system 10 of FIG. 1 has been described as converting from one domain to another (e.g., digital to analog), as those skilled in the art can readily appreciate the present invention can also be used for signal conversion within the same domain. For example, signal converter 14 may be a mixer for frequency conversion, either up conversion or down conversion, a clipping circuit, amplifier, and/or a filter. The signal converter 14 may also comprise a plurality of converters, for example a digital signal may be clipped, converted to analog, and up converted.

It is to be appreciated that the present invention reduces linearity requirements in transmit and receive chains. Reduced linearity is desirable because it enables lower cost and less complex components such as amplifiers, frequency conversion components, ADCs and DACs to be used. A greater range of frequency plans can be employed. For example, many ADCs provide their best performance at low IF, which can require a double down-conversion. Unfortunately, double down conversion architectures produce a large number of spurs. To accept these spurs, highly linear components are necessary.

To understand one of the benefits of spreading, assume there are two modulated carriers, $s_1(t)=A(t)\cos[\omega_1 t+\phi_1(t)]$ and $s_2(t)=B(t)\cos[\omega_2 t+\phi_2(t)]$. In many modern communications systems the bandwidth of these wanted signals is dominated by the phase modulation term, $\phi(t)$. These carriers are received by a signal chain with a non-linearity which can be modeled as having an output O(t), proportional to the cube of the input; $O(t) \sim (s_1+s_2)^3$. The proportionality varies with the amount of the non-linearity (deviation from pure linear). For simplicity assume A and B are the same and are constant, then $O \sim s_1^3+s_2^3+3s_1^2 s_2+3s_2^2 s_2$. The non-linearity can result from a mixer, amplifier, ADC, DAC, and/or any other component.

The terms that are cubed have center frequencies about 3 times higher than the wanted signals. The terms $3s_1^2 s_2+3s_2^2 s_2$ are the third-order intermodulation (IM) terms, centered at $2\omega_2-\omega_1$ and $2\omega_1-\omega_2$. The total power in the IM signal is mostly determined by the degree of non-linearity. The bandwidth of the IM is determined by $\cos[\omega_1 t+\phi_1(t)]^2 \cos[\omega_2 t+\phi_2(t)]$ and $\cos[\omega_2 t+\phi_2(t)]^2 \cos[\omega_1 t+\phi_1(t)]$, respectively. In the frequency domain each time-domain multiplication is a convolution operation. Thus each third-order IM is proportional to the convolution of each signal with itself (the squared terms) and then with the other signal, $s_1 * s_1 * s_2$ and $s_2 * s_2 * s_1$.

Figure 2:
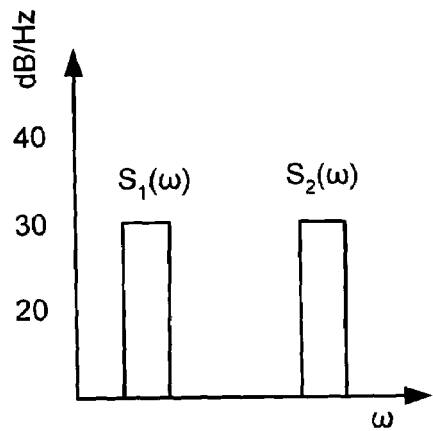
FIG. 2 is an example graphical illustration of the power spectral density of two signals.
Figure 3:
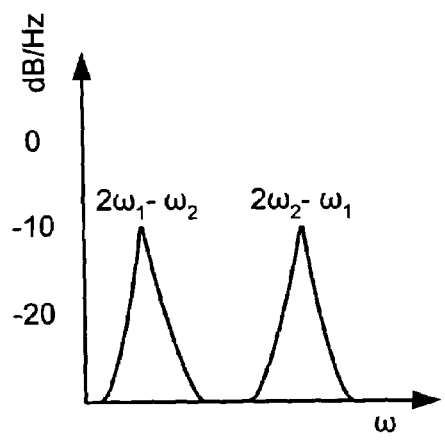
FIG. 3 is an example graphical illustration of the power spectral density of the third order intermodulations (IM) of the signals of FIG. 2.

These signals have bandwidths, as shown in FIG. 3, are roughly three times that of the wanted signals (shown in FIG. 2). When the non-linearity has terms that are approximated by $4^{th}$, $5^{th}$, or higher order terms the resulting IMs or spurious signals will be spread proportionate to the exponent.

Figure 4:
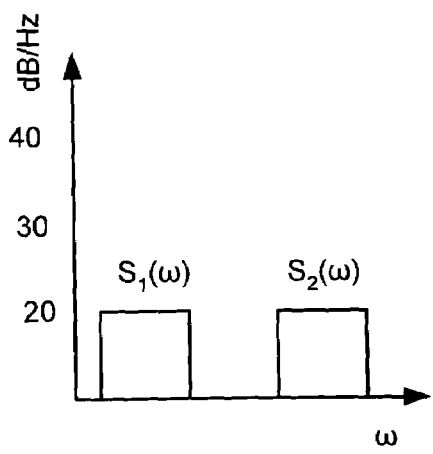
FIG. 4 is an example graphical illustration of the power spectral density of the two signals of FIG. 2 after spreading.

FIG. 2 illustrates $s_1$ and $s_2$ without spreading, and FIG. 4 illustrates $s_1$ and $s_2$ with spreading. The two set of signals have the same integrated power but at different power densities. The diagrams are notional but represent ~10 dB of spreading. The y-axis of FIGS. 2-9 illustrates relative signal levels and are intended to show the impact of the spreading on the original signals and the IMs. It should be noted that even a single signal passing through a non-linear system results in a broadening or sprectral regrowth due to odd order non-linearities.

Figure 5:
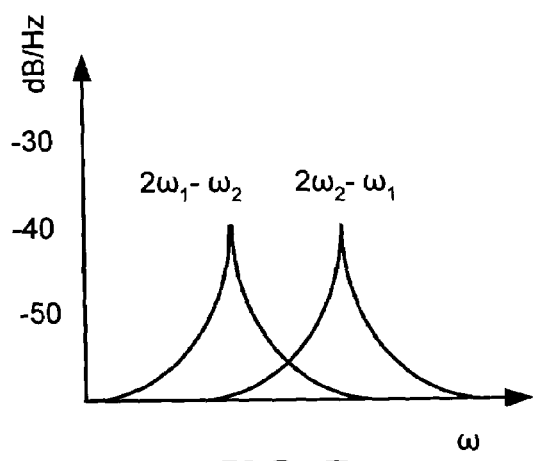
FIG. 5 is an example graphical illustration of the power spectral density of the third order intermodulations of the signals of FIG. 4.

FIG. 3 illustrates the third order IM that would occur from the signals in FIG. 2 if no spreading is applied. FIG. 5 shows the IMs resulting from the spread signals in FIG. 4. FIGS. 3 and 5 illustrate that The IM's have wider bandwidth than the original signals (note if $s_1$ and $s_2$ are tones only or single signals with BPSK modulation then their IMs will have the same bandwidth as the original signals; the convolution of tones with each other results in tones and BPSK signals convolved with themselves result in BPSK signals. Some other antipodal modulation forms may have similar properties.).

An aspect illustrated in FIGS. 3 and 5 is that the amplitude of the IM products with spreading (FIG. 5) is~30 dB lower than the IMs from the unspread signals (FIG. 3). This is because the convolution, which is a sliding the sum or integral of the products of the signals as they are 'slid' past each other, has a level proportional to the cube of the the original signals. The spectral density of a spread signal is determined by the the spreading factor S, which is the ratio of the width of the spread signal to an unspread signa). In the example provided S is ~10 dB and the spectral density of s1 and s2 is $\frac{1}{10}^{th}$ of the unspread signals. Passing the spread signal with decreased spectral density results in IMs whose spectral density is ~30 dB below the IMs resulting from unspread signals (as can be seen comparing FIGS. 3 and 5, respectivley.

Another feature illustrated by FIGS. 3 and 5 is that the spread IMs (FIG. 5) occupy approximately 10 times the bandwidth of the IMs resulting from the unspread signals (FIG. 3). Another aspect of spreading which is not evident in FIGS. 3 and 5 is that the spread signal of the IMs may not be coherent with the spreading code used on the original signals.

Figure 6:
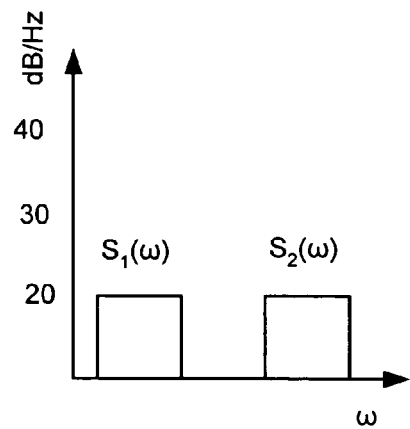
FIG. 6 is a graphical illustration of the power spectral density of the two signals of FIG. 2 after spreading.
Figure 7:
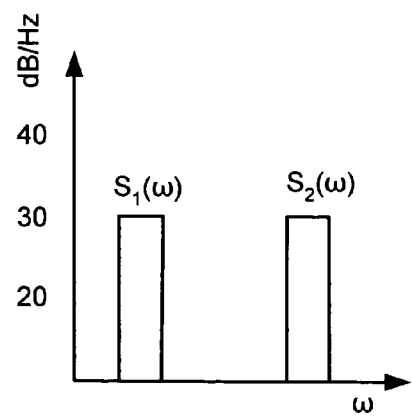
FIG. 7 is a graphical illustration of the power spectral density of the two signals of FIG. 6 after 10 dB of despreading gain is applied.
Figure 8:
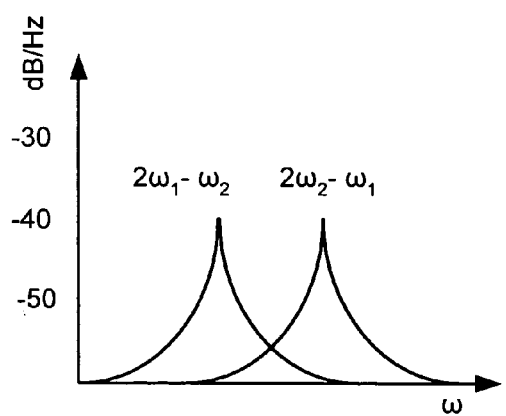
FIG. 8 is a graphical illustration of the power spectral density of the third order intermodulations after spreading the signals of FIG. 4.
Figure 9:
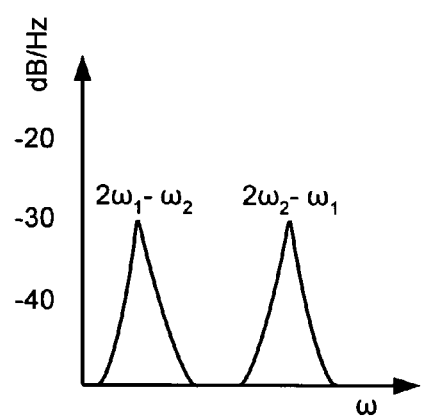
FIG. 9 is a graphical illustration of the power spectral density of the third order intermodulations of the signals of FIG. 6 after 10 dB of despreading gain is applied.

FIGS. 7 and 9 illustrate the signals and the resulting IM levels after ~10 dB of (de)spreading gain is applied to the signals illustrated in FIGS. 3 and 5 (reproduced as FIGS. 6 and 8, respectively). The original signals are fully recovered at their original signal levels (FIG. 7). However, the IM products which were reduced ~30 dB due to spreading are despread to a level ~20 dB below the level of the IM products without the spreading (note the scale of the y-axis of FIG. 9 compared to FIG. 3). This is the same result as if the degree of non-linearity of the system had been reduced 20 dB. The IM improvement in dB is roughly 10 log S(I−1), where S is expressed in dB and I is the order of the intermodulation product or spur. Higher order IMs show greater reduction in power levels.

The wide bandwidth of the IMs when spreading is used introduces the possibility of filtering some of the IM power before despreading, as it is likely that some of the power will be spread outside of the band of interest. If filtering can be applied before despreading then the relative IM power will be reduced.

It is also possible that full (de)spreading gain will not be applied to the IMs. The despreading gain is maximized when there is a correlation between the signal of interest (spread with a code) and the despreading using the same code. Since IMs are inherently a non-linear product of the signals occupying a much different bandwidth (and accordingly different temporal properties), they may not be able to line-up or correlate with the code. Any imperfection in despreading of the IM products maintains them at a wider bandwidth with lower power density in most channels.

Without filtering or imperfect despreading there is a substantial reduction in non-linear products. This reduction allows either much higher performance of the receive chain or a significant relaxation of the linearity of all of the components located between the spreading and despreading functions.

Figure 10:
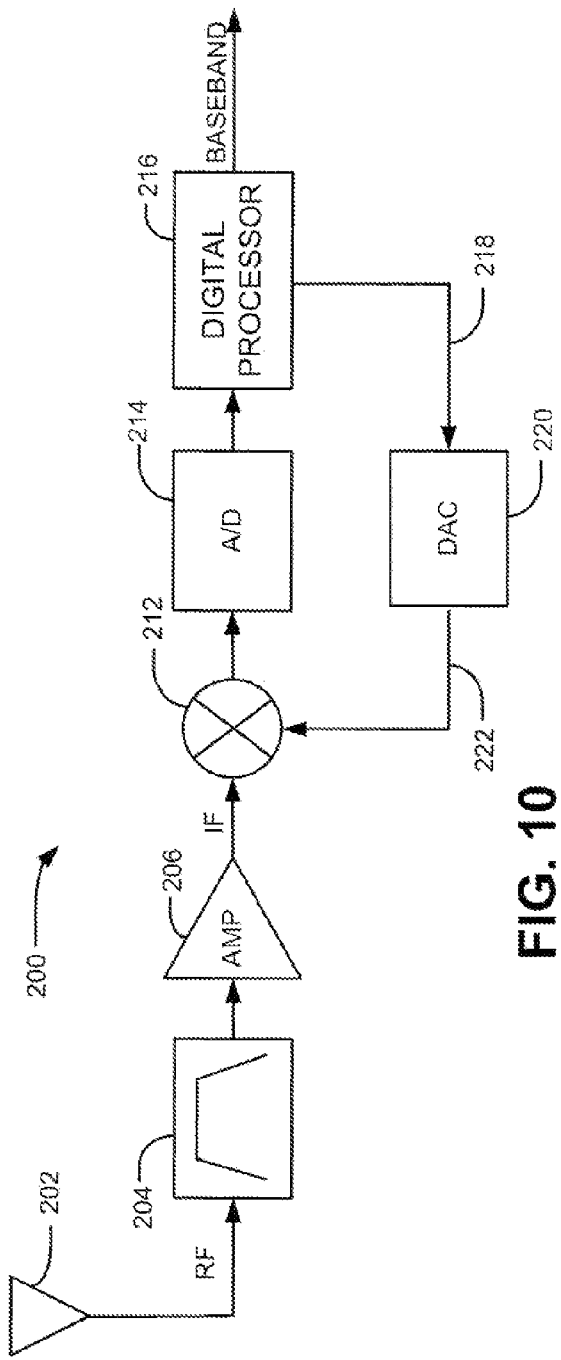
FIG. 10 is a block diagram schematically illustrating a receiver circuit in accordance with an aspect of the present invention.

FIG. 10 illustrates a receiver circuit 200 that employs spreading prior to analog to digital conversion in accordance with an aspect of the present invention. The receiver circuit 200 employs digital spreading codes that provide a digital spread spectrum signal that can be combined with an input signal of an ADC 214. The spreading code is converted to an analog signal by a DAC 220 and mixed with an analog input signal before it is converted to the digital domain by the ADC 214.

A signal is received by an antenna 202 and filtered by a bandpass filter 204. The output of bandpass filter 204 is amplified by an amplifier 206. The amplified signal is input to mixer 212 and spread by an analog spreading signal 222. Mixer 212 may also be used for frequency conversion, or additional mixers may be added to the circuit. The spread signal is then converted to the digital domain by the ADC 214.

The digital spread signal is provided to a digital processor 216 where it is despread using substantially the same digital spread spectrum signal used to spread the signal. Digital processor 216 time aligns the despreading of the digital spread IF signal to provide a baseband output signal. Digital processor 216 produces the spreading signal 218. The spreading signal is converted to the analog domain, via DAC 220, into an analog spreading signal 222. The spread spectrum signal 218 can be a direct sequence, a frequency hopped, or a combination of discrete sequence and frequency hopped spread spectrum signal. Signals received by the antenna that are not the wanted signal will be spread and despread similar to the wanted signals. These signals are not suppressed in general by the present invention except where the spreading function moves some of the interference outside of a filter used to pass the wanted signals. Spurious signals resulting from large interferers are suppressed by the present invention.

Figure 11:
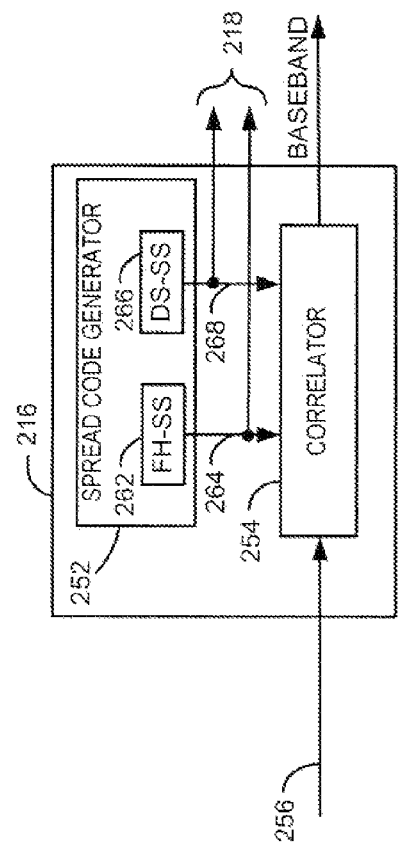
FIG. 11 is a functional block diagram of a digital processor in accordance with an aspect of the present invention.

Referring to FIG. 11 with continued reference to FIG. 10, there is schematically illustrated the functional components of digital processor 216. The digital processor 216 comprises spread code generator 252, and correlator 254. Correlator 254 receives input signal 256 from ADC 214 and spread code signal 218 from spread code generator 252. Correlator 254 time aligns and despreads signal 256. In the illustrated implementation, the spread code generator 252 comprises a frequency hopped spread spectrum (FH-SS) code generator that provides an FH-SS spreading code 264 and a direct sequence spread spectrum (DS-SS) spreading code generator 266 that provides a DS-SS spreading code 268. Spread code signal 218 is also provided to DAC 220 to provide spread code to spread the analog IF signal from the mixer 208. It will be appreciated the spread code signal 218 can include both the FH-SS spreading code 264 and the DS-SS spreading code 268 for use in spreading the analog IF signal at the one or more mixers 212. Although FIG. 11 illustrates the digital processor 216 having a spread signal code generator 252 and correlator 254, those skilled in the art can readily appreciate, any or all of these functions may be performed by circuits external to the digital processor 216, and/or software algorithms executed by the digital processor 216, and the examples presented herein should not be construed as limited to these functions being performed by a digital processor. Alternatively, a time delay (not shown) can be used to synchronize the spreading and despreading circuits which may eliminate the need for correlator 254 to perform the time alignment.

Figure 12:
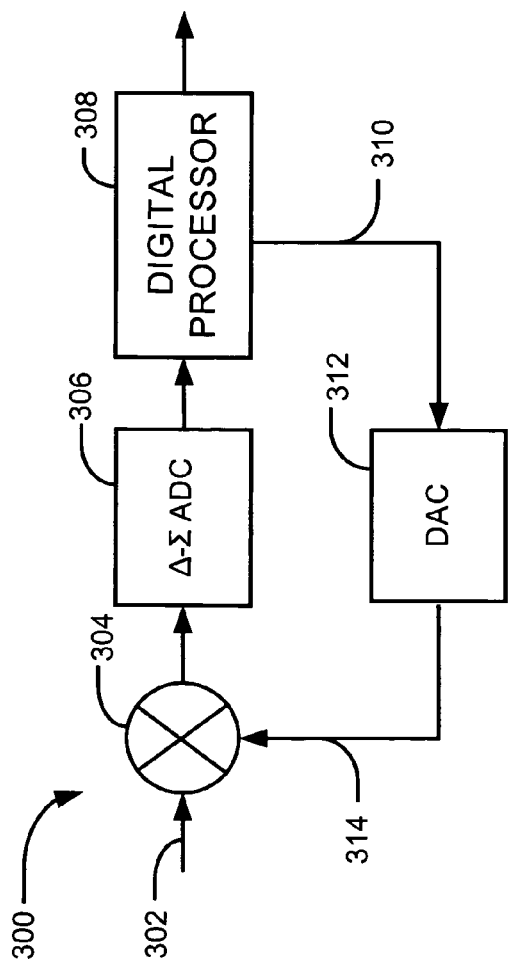
FIG. 12 is a block diagram schematically illustrating a signal processing circuit in accordance with an aspect of the present invention.

Referring now to FIG. 12 there is schematically illustrated a system 300 with a delta sigma ADC 306 in accordance with another aspect of the present invention. Delta Sigma modulation is a technique used to generate a coarse estimate of a signal using a small number of quantization levels and a very high sampling rate. The small number (two for a one-bit quantizer) of quantization levels introduces "quantization" noise into the system. The effect of oversampling and the use of an integrator feedback-loop in delta-sigma modulation are effective in shifting noise to out-of-band frequencies. The noise shifting properties and introduction of quantization error enables efficient use of subsequent filtering stages to remove noise and produce a more precise representation of the input at a much higher frequency. Delta sigma DACs can be employed to upconvert the input signal directly to radio transmission frequencies, such that further frequency conversion of the signals via conventional mixers is not required. The radio transmission frequencies can be in radio frequency (RF) ranges (e.g., megahertz range) or in microwave frequency ranges (e.g., gigahertz range). Delta sigma ADCs can be employed to downconvert the input signal directly from radio transmission frequencies to intermediate frequencies, such that further frequency conversion of the signals via conventional mixers is not required.

Digital processor 308 produces a spreading signal 310 that is sent to DAC 312 and converted to an analog spreading signal 314. Mixer 304 mixes an input signal 302 with the analog spreading signal 314. The spread analog input signal is sent from mixer 304 to delta-sigma ADC 306. The output of the delta-sigma ADC 306 is input into the digital processor 308 for despreading and other functions such as time alignment.

Figure 13:
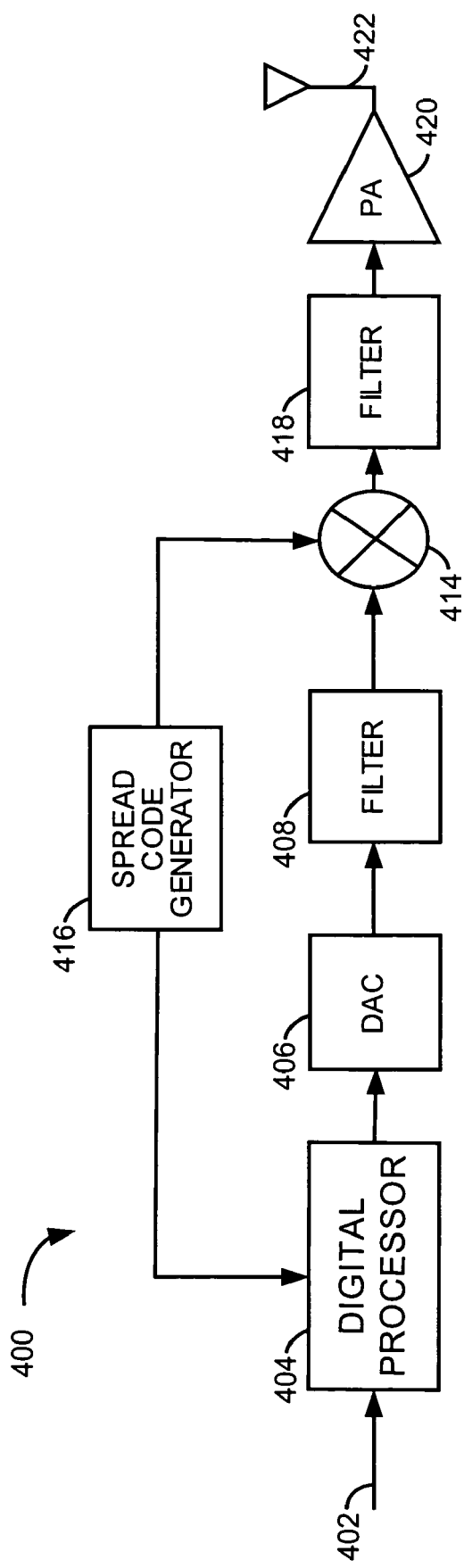
FIG. 13 is a block diagram schematically illustrating a transmitter circuit in accordance with an aspect of the present invention.

FIG. 13 illustrates a transmitter circuit 400 in accordance with an aspect of the invention. The transmitter circuit 400 spreads a digital signal via a spreading code, converts the spread digital signal to the analog domain, and up converts the spread analog signal before despreading. The transmitter circuit 400 includes a digital processor 404 that receives a digital input signal 402 and spreads the digital input signal 402 with a spreading signal generated by a spreading code generator 416. Although spreading code generator 416 is shown as a separate element, it can also be a part of digital processor 404. The spread digital input signal is provided to DAC 406 which converts the spread digital input signal to the analog domain to provide a spread analog signal. The spread analog signal is then filtered by filter 408. The filtered signal is sent to mixer 414 where it is despread by mixing with the spreading signal from the spreading code generator 416. In addition, mixer 414 can be used for frequency conversion, or a separate mixer (not shown) and local oscillator (not shown) can be used for frequency conversion either before or after despreading. The despread signal is subsequently filtered by filter 418, amplified by amplifier 420 and transmitted via antenna 422 the latter two are optional. An aspect of spreading for transmitter circuits and DACs is based on the same mathematics as it was in the receiver. Higher order non-linearities are suppressed to a greater degree than lower order ones and a greater degree of spreading further suppresses non-linear signals.

Figure 14:
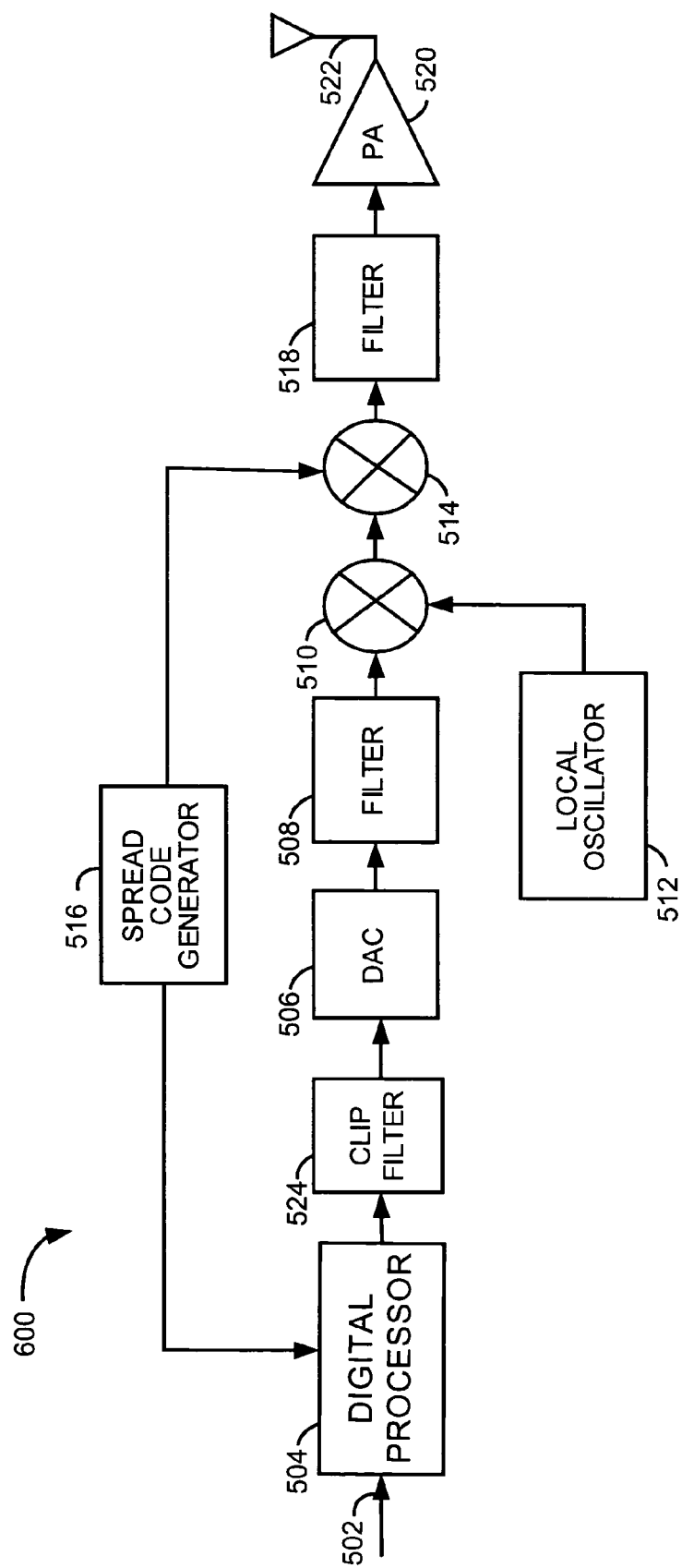
FIG. 14 is a block diagram schematically illustrating a transmitter circuit in accordance with another aspect of the present invention.

FIG. 14 illustrates a transmitter circuit 500 that employs clipping in accordance with an aspect of the present invention. Existing techniques to reduce peak-to-average ratios (PAR) are content with the resultant degradations to wanted signals (characterized by modulation error or error vector magnitude, EVM) and out-of-band (OOB) emissions. The present invention employs spreading and despreading techniques to mitigate the resultant degradation and OOB emissions caused by clipping. The transmitter circuit 500 includes a digital processor 504 that mixes an input signal with a spreading signal (not shown) produced by spreading code generator 516. Spreading code generator 516 may be a separate circuit as shown or can be a module within digital processor 504. After spreading, the signal is clipped by clip filter 524 and then converted to the analog domain by DAC 506, and subsequently filtered by filter 508. The clipping filter 524 can be a soft or hard clipping filter. Additionally, the clipping filter 524 can perform a fixed or shape limiting algorithm to reduced the peaks and peak-to-average ratio (PAR) associated with the spread input signal. The signal is then frequency converted by mixer 510 with local oscillator 512. The output of mixer 510 is then input into mixer 514. Another input of mixer 514 receives the spreading code in the analog domain from spreading code generator 516 and the signal is then despread. Subsequently, the signal is filtered by filter 518, amplified by amplifier 520 and transmitted via antenna 522.

Figure 15:
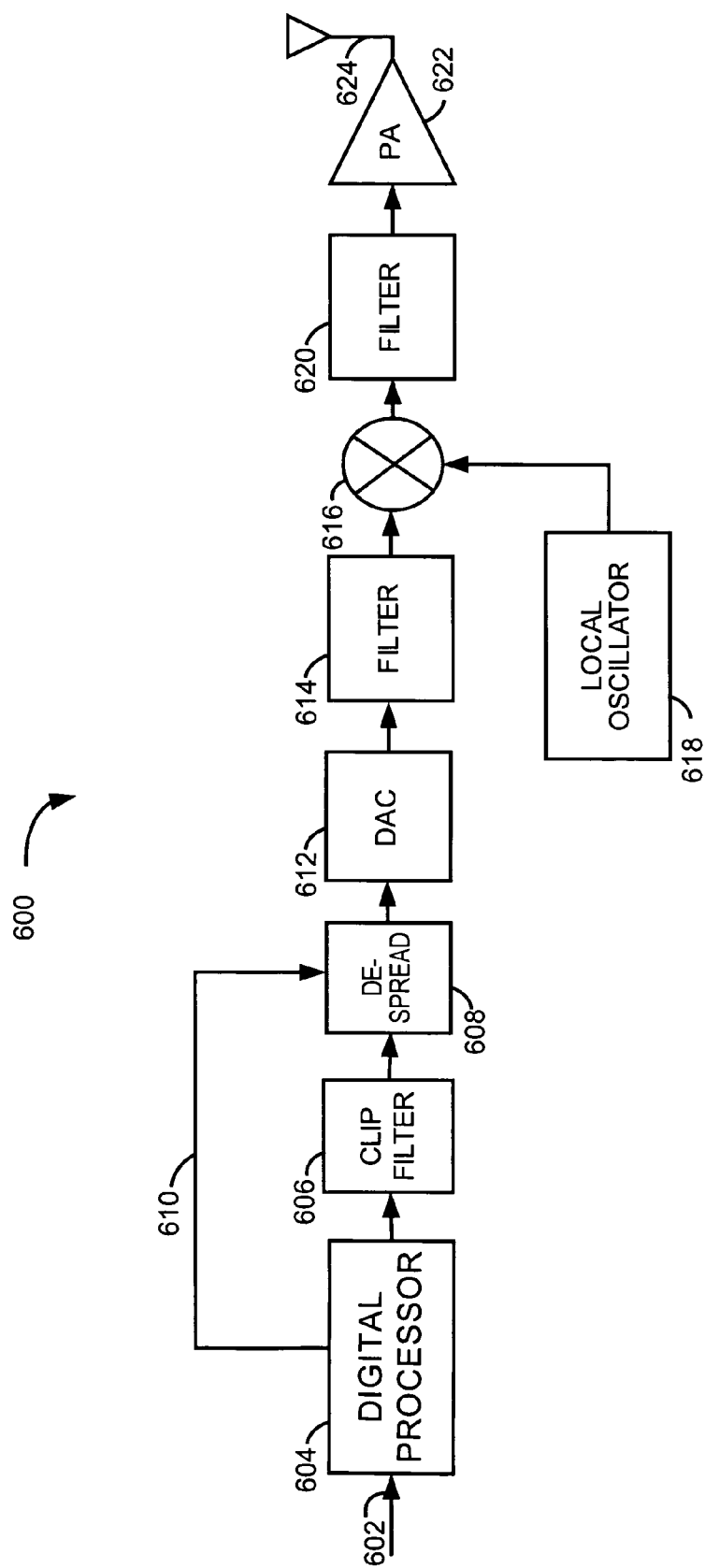
FIG. 15 is a block diagram schematically illustrating a transmitter circuit in accordance with yet another aspect of the present invention.

FIG. 15 is a transmitter circuit 600 in accordance with yet another aspect of the present invention. The transmitter circuit 600 is operative to spread an input signal, clipped the spread input signal and despread the clipped spread input signal prior to digital to analog conversion. The transmitter circuit 600 includes a digital processor 604 that receives signal 602 and spreads the signal 602 with a spreading signal 610. Spreading signal 610 may be generated by digital processor 604, or may be provided by an external spreading code generator (not shown). The output of the digital processor is input into clip filter 606. The clip filter 606 reduces the peaks and PAR associated with the spread input signal. The output of clip filter 60 is then input into a digital despreader 608 which receives spreading signal 610 from digital processor 604. Digital processor 604 would also handle any time alignment or synchronization required for despreading. The clipped and despread signal is sent from mixer 608 to DAC 612 where it is converted to an analog signal. The analog signal is filtered by filter 614 and then frequency converted by mixer 616 which mixes the filtered signal with a signal from a local oscillator 618. The frequency converted signal is then filtered by filter 620, amplified by amplifier 622 and subsequently transmitted via antenna 624. Clipping can be thought of as having a non-linear transfer function. It results in errors to the wanted signal (which are readily tolerated for signals with large PAR values) and OOB emissions which are usually strictly limited by standards. The spreading/despreading functions reduce the OOB emissions just as they would the impact of any other non-linearity. Clipping can also be applied in receive circuits as needed to reduce dynamic range of signals.

Figure 16:
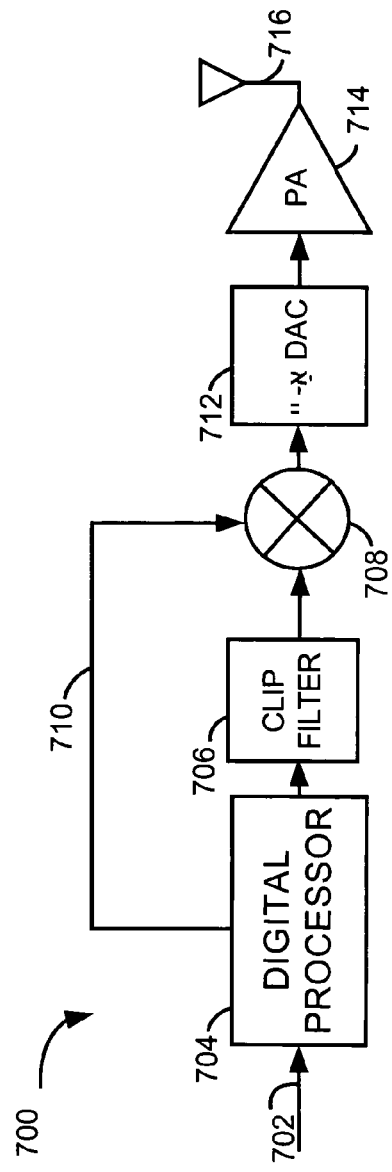
FIG. 16 is a block diagram schematically illustrating a transmitter circuit with a delta-sigma digital-to-analog converter (DAC) in accordance with another aspect of the present invention.

FIG. 16 illustrates a transmitter circuit 700 that employs a delta-sigma DAC in accordance with an aspect of the present invention. A delta-sigma DAC can be employed to upconvert the input signal directly to radio transmission frequencies, such that further frequency conversion of the signals via conventional analog mixers is not required. The radio transmission frequencies can be in radio frequency (RF) ranges (e.g., megahertz range) or in microwave frequency ranges (e.g., gigahertz range). The transmitter circuit 700 includes a digital processor 704 that receives and spreads an input signal 702. The spread signal is clipped by clip filter 706. The clipped signal is then despread via mixer 708, which receives the signal from clip filter 706 and the spreading signal 710 from digital processor 704. The despread signal from mixer 708 is input into a delta-sigma DAC 712. The output of the delta-sigma DAC 712 is input into amplifier 714 for amplification and is subsequently transmitted via antenna 716.

Another aspect of the present invention is directed to methods for processing a signal. While, for purposes of simplicity of explanation, a methodology is shown and described as executing serially, it is to be understood and appreciated that the present invention is not limited by the order shown, as some aspects may, in accordance with the present invention, occur in different orders and/or concurrently from that shown and described herein. Moreover, not all features shown or described may be needed to implement a methodology in accordance with the present invention. Additionally, such methodology can be implemented in hardware (e.g., one or more integrated circuits), software (e.g., running on a DSP or ASIC) or a combination of hardware and software.

FIG. 17 illustrates a method 800 for signal conversion in accordance with an aspect of the present invention. The methodology begins at 802 where a signal is received. The signal is then filtered at 804 and amplified at 806. At 808, the signal is converted to IF, for example, via mixing with a mixer. At 810, the converted IF signal is spread via a spreading code. The signal can be spread via direct sequence spread spectrum (DS-SS), frequency hopped spread spectrum (FH-SS), a combination of DS-SS and FH-SS, or other spreading technique. For DS-SS, the spreading signal is continuous in the frequency domain. The signal is then converted from the analog domain to the digital domain at 812. At 814, the signal is despread using substantially the same spreading code for spreading. However, the despreading signal is converted from the digital domain to the analog domain prior to despreading. Furthermore, time synchronization, if necessary, can be employed during spreading and/or dispreading.

FIG. 18 illustrates another methodology 900 for signal conversion in accordance with an aspect of the present invention. The method 900 includes a frequency conversion and digital to analog signal conversion. A digital signal is spread at 902 using any of the aforementioned spreading techniques. At 904, the digital spread signal is converted to the analog domain, and the analog spread signal is filtered at 906. At 908, the signal is converted to a different frequency via frequency conversion. At 910, the signal is despread using substantially the same spreading code for spreading. However, the despreading signal is converted from the digital domain to the analog domain prior to despreading. Furthermore, time synchronization, if necessary, can be employed during spreading and/or despreading.

FIG. 19 illustrates a signal conversion method 1000 that includes clipping and frequency conversion in accordance with another aspect of the present invention. At 1002, an input signal is spread utilizing any of the aforementioned spreading techniques. At 1004, the signal is clipped using a clipper or limiter. At 1006, the signal is converted from the digital domain to the analog domain, and then filtered at 1008. At 1010, the signal is frequency converted. At 1012, the signal is despread using substantially the same spreading code for spreading. However, the despreading signal is converted from the digital domain to the analog domain prior to despreading. Furthermore, time synchronization, if necessary, can be employed during spreading and/or despreading. At 1012 the signal is despread. At 1014 the signal is filtered. At 1016 the signal is amplified and transmitted at 1018.

FIG. 20 illustrates yet another signal conversion method 1100 in which the clipping is performed on a spread signal in accordance with an aspect of the present invention. At 1102, a signal is spread using any of the aforementioned spreading techniques. The spread signal is clipped at 1104, for example, employing a clipping filter or other peak reduction technique. At 1106, the signal is despread using substantially the same signal as was used for spreading. The despreading may need to be time aligned, which can also occur at 1106. At 1108, the signal is converted to the analog domain and frequency converted at 1110. For transmitting, the signal can be up converted. However, the signal may be down converted if desired. At 1112, the signal is transmitted.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A transmitter system, comprising:
   a spreading code generator that produces a spreading code;
   a spreader that combines the spreading code with an input signal to provide a spread input signal;
   a signal converter that converts the spread input signal from a first domain to a second domain to provide a converted spread input signal;
   a mixer for frequency converting the converted spread input signal to provide an upconverted spread input signal;
   a despreader that despreads the upconverted spread input signal to provide a despread signal; and
   an antenna that transmits the despread signal.

2. The transmitter system of claim 1, funher comprising a feedback loop coupling the despreader to the spreader for time aligning the despreading with the spreading.

3. The transmitter system of claim 1, wherein the first domain is one of a digital domain and an analog domain and the second domain is the other of the digital domain and the analog domain.

4. The transmitter system of claim 1, wherein the signal converter is one of a delta-sigma analog-to-digital converter (ADC) and a delta-sigma digital-to-analog converter (DAC).

5. The transmitter system of claim 1, further comprising a clipping component that reduces peaks associated with the spread input signal, the despreader mitigates degradation and out-of-band (OOB) emissions associated with the peak reduction.

6. The transmitter system of claim 1, wherein at least one of the spreader and the despreader circuit comprises a mixer.

7. A transmitter system comprising:
   a spreading code generator that produces a direct sequence spread spectrum (DS-SS) spreading code;
   a spreading circuit that receives an input signal and combines the input signal with the DS-SS spreading code to provide a spread input signal;
   a clipping component that reduces peaks associated with the spread input signal;
   a signal converter that converts the spread input signal form a first domain to a second domain;

a despreading circuit that despreads the peak reduced spread input signal;and an antenna for transmitting the despread peak reduced input signal.

8. The system of claim 7, wherein at least one of the spreading circuit and despreading circuit comprises a mixer.

9. The system of claim 7, the signal converter being one of a digital-to-analog converter (DAC) and an analog-to-digital converter (ADC).

10. The system of claim 9, the signal converter being one of a delta-sigma DAC and a delta-sigma ADC.

11. The system of claim 9, further comprising a mixer for frequency converting the spread input signal one of before signal conversion and after signal conversion.

12. A method for transmitting a signal, comprising:
spreading a digital signal with a spreading signal code;
converting the digital spread signal to an analog signal;
modulating the analog signal to produce an upconverted analog signal;
despreading the upconverted analog signal to provide a despread signal; and
transmitting the despread signal.

13. The method of claim 12, further comprising clipping the signal to reduce peaks associated with the signal.

14. A transmitter comprising:
means for generating a direct sequence spread spectrum (DS-SS) spreading code;
means for combining the DS-SS spreading code with an input signal to produce a spread input signal
means for clipping the spread input signal to remove peaks;
means for converting the spread input signal from a first domain to a second domain;
means for despreading the spread input signal in the second domain; and
means for transmitting the despread input signal.

* * * * *